(12) United States Patent
Walenty et al.

(10) Patent No.: US 6,704,635 B2
(45) Date of Patent: Mar. 9, 2004

(54) METHOD FOR DETERMINING OPTIMAL ABS SLIP AND DECELERATION THRESHOLDS

(75) Inventors: Allen John Walenty, Macomb, MI (US); Kevin Gerard Leppek, Rochester Hills, MI (US); David Alan Thatcher, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/184,261

(22) Filed: Jun. 26, 2002

(65) Prior Publication Data

US 2004/0002804 A1 Jan. 1, 2004

(51) Int. Cl.$^7$ ................................................. G06F 7/00
(52) U.S. Cl. ............................. 701/71; 701/70; 701/73
(58) Field of Search ............................ 701/70, 71, 72, 701/73, 80; 303/150, 166

(56) References Cited

U.S. PATENT DOCUMENTS 6,079,801 A * 6/2000 Zittlau ........................ 303/150

* cited by examiner

Primary Examiner—Yonel Beaulieu
(74) Attorney, Agent, or Firm—Christopher DeVries

(57) ABSTRACT

A vehicle anti-lock braking system includes a brake pedal and a brake modulator. The brake system reduces braking pressure by an initial pressure reduction after detecting insipient wheel lock. Vehicle deceleration is measured as a function of brake pedal position. A first table is updated with the vehicle deceleration and the brake pedal position. A coefficient of friction of a road surface is estimated based on the first table. Wheel slip and deceleration target thresholds are determined based on the coefficient of friction. The wheel slip and deceleration target thresholds are used to populate a command table for the anti-lock braking system. Brake heat, brake torque, vehicle weight and grade are estimated. Release and apply pressures are calculated from an adjusted coefficient of friction, a coefficient of friction and the grade.

35 Claims, 3 Drawing Sheets

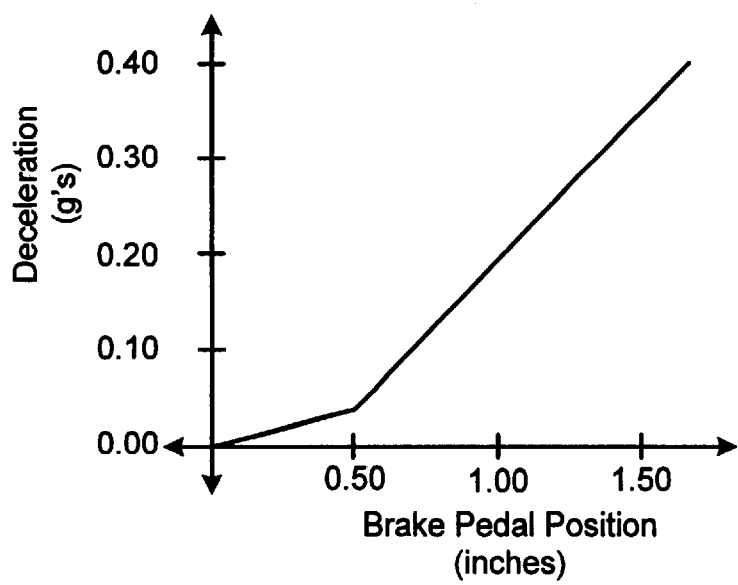
FIG. 2
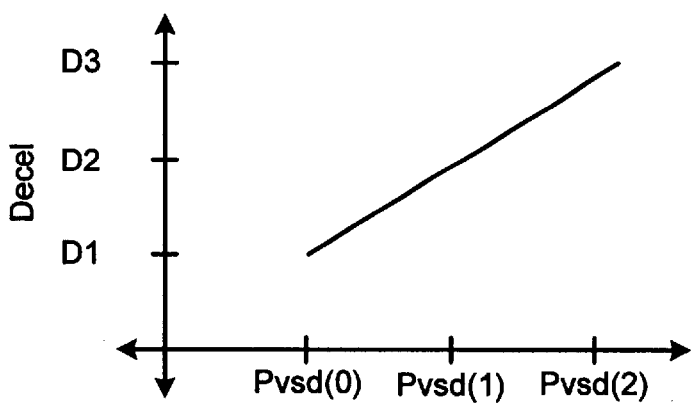
FIG. 3
| ABS_Table | | | % Slip | | |
|---|---|---|---|---|---|
| | 3% | 5% | 8% | 10% | 13% |
| D  .075 g | 3 | 4 | 6 | 7 | 7 |
| E  .225 g | 2 | 3 | 5 | 6 | 7 |
| C  .450 g | 1 | 2 | 4 | 5 | 6 |
| E  .675 g | 0 | 1 | 3 | 4 | 5 |
| L  .900 g | 0 | 0 | 1 | 3 | 4 |
ABS look-up table definitions
0=exit           4=hold
1=apply fast     5=release slow
2=apply medium   6=release medium
3=apply slow     7=release fast
FIG. 4

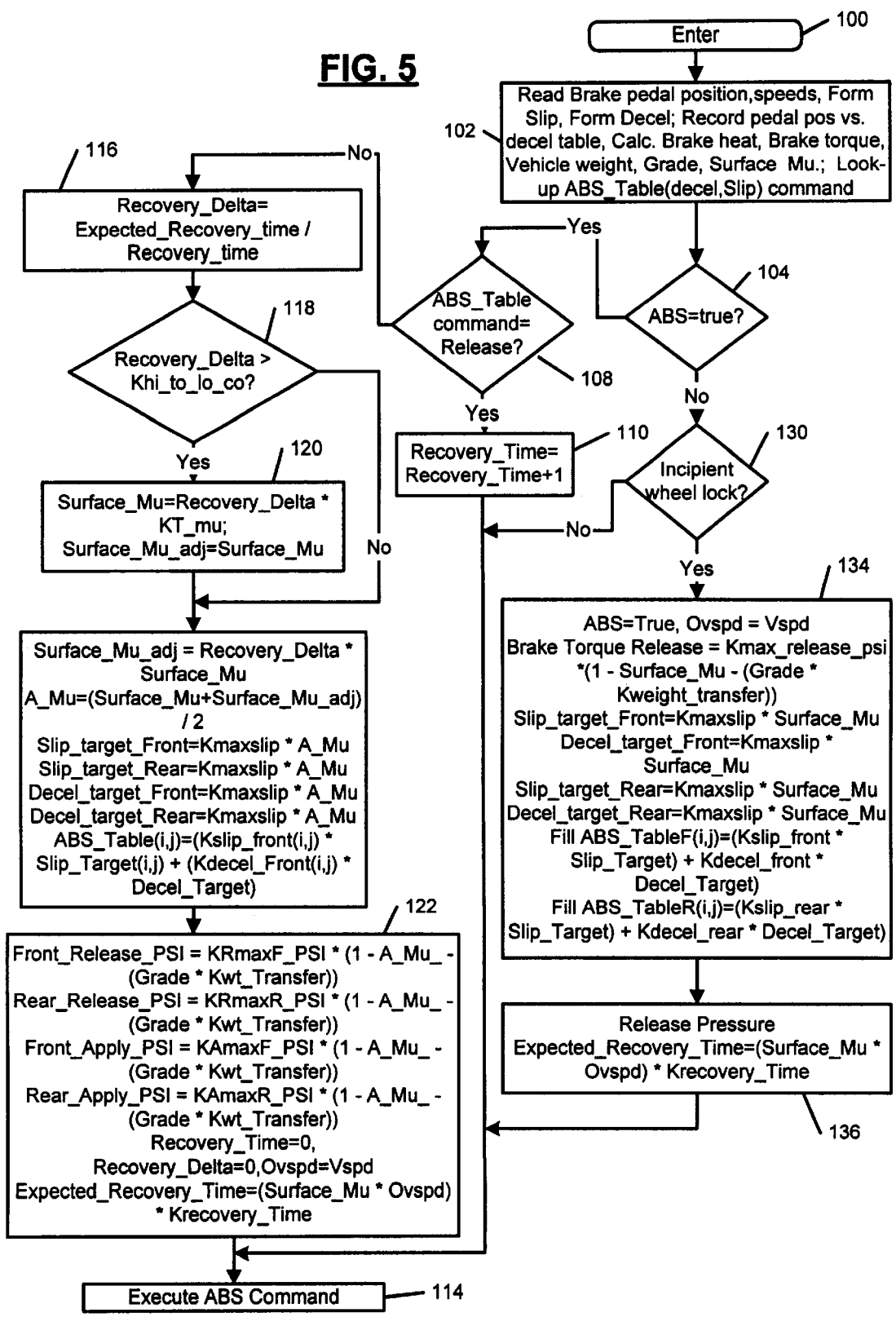

METHOD FOR DETERMINING OPTIMAL ABS SLIP AND DECELERATION THRESHOLDS

TECHNICAL FIELD

The present invention relates to vehicle anti-lock braking systems, and more particularly to a system and method for determining anti-lock braking slip and deceleration thresholds.

BACKGROUND OF THE INVENTION

Motor vehicle anti-lock braking systems modulate hydraulic brake pressures upon detection of insipient wheel lock to maximize friction between tires of a vehicle and a road surface. At incipient wheel lock, the brake pressures are initially reduced by an amount that is based on an assumed coefficient of friction between the tires of the vehicle and the road surface. The brake pressures are re-applied once the acceleration of the wheels exceed a predetermined acceleration value.

Since the coefficient of friction is ordinarily unknown, the initial brake pressure reduction is typically calculated for a worst-case road surface, such as glare ice. This approach provides a somewhat degraded braking performance when the road surface has a relatively high coefficient of friction. Most road surfaces have substantially higher coefficients of friction than glare ice. In other words, the brake pressures are reduced more than is typically required by the road surface.

After the initial brake pressure reduction, the coefficient of friction is estimated based on a time period that is required for the wheels to accelerate to the reference acceleration value. The rate of brake pressure re-application is determined based on the estimated coefficient of friction. Although the coefficient of friction can be initially estimated from the brake pressure or the brake pedal force, the sensors for obtaining such information significantly increase the cost of the anti-lock braking system. The estimated coefficient of friction is subject to errors when the relationship between brake pressure and brake torque deviates from the norm.

Some conventional anti-lock braking systems include a "peak seeking" control method that slowly adjusts the wheel slip and wheel deceleration thresholds by applying rate controlled brake pressure increases. This peak seeking method may require several apply and release cycles to find the correct slip and deceleration target thresholds. Time wasted during the peak seeking control method lengthens the total stopping distance on all surface types.

SUMMARY OF THE INVENTION

A control system and method according to the present invention operates a vehicle anti-lock braking system. The braking system includes a brake pedal and a brake modulator. The brake system reduces braking pressure by an initial pressure reduction after detecting insipient wheel lock. Vehicle deceleration is measured as a function of brake pedal position. A first table is updated with the vehicle deceleration and the brake pedal position. A coefficient of friction of a road surface is estimated based on the first table. Wheel slip and deceleration target thresholds are determined based on the coefficient of friction.

In other features, the wheel slip and deceleration target thresholds are used to populate a command table for the anti-lock braking system. Brake heat, brake torque, vehicle weight and grade are estimated.

In still other features, a wheel recovery timer is set equal to zero. Onset vehicle speed is determined. An actual recovery time that is required for wheels of the vehicle to accelerate to a predetermined acceleration level is timed. An expected recovery time is calculated and compared to the actual recovery time.

In yet other features, a recovery delta is calculated based on the expected and actual recovery times. The coefficient of friction is updated if the recovery delta is greater than a first constant. An adjusted coefficient of friction is calculated based on the recovery delta and the coefficient of friction. Wheel slip is calculated based on the adjusted coefficient of friction, the coefficient of friction, and the target wheel slip. Wheel deceleration is calculated based on the adjusted coefficient of friction, the coefficient of friction, and the target wheel deceleration. The command table is updated with the wheel slip and deceleration. Release and apply pressures are calculated from the adjusted coefficient of friction, the coefficient of friction and the grade.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a graph showing deceleration as a function of brake pedal position;

FIG. 3 is a graph showing deceleration as a function of three brake pedal positions;

FIG. 4 is a table showing deceleration as a function of slip; and

FIG. 5 is a flowchart illustrating exemplary steps performed by the anti-lock braking system according to the present invention.

DESCRIPTION OF THE PREFERRED EMBODIMENT

Figure 1:
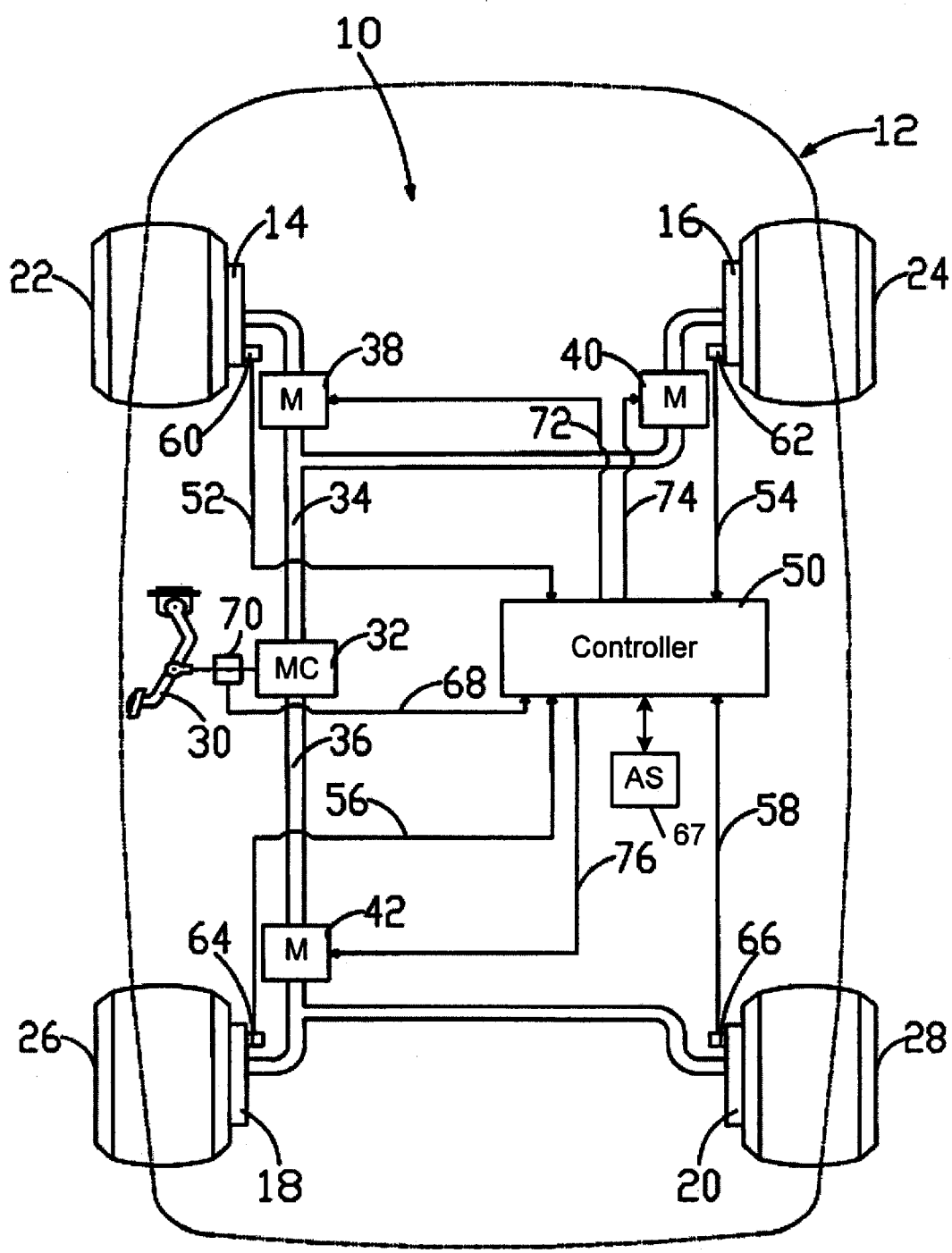
FIG. 1 is a functional block diagram of an anti-lock braking system according to the present invention.

The following description of the preferred embodiment(s) is merely exemplary in nature and is in no way intended to limit the invention, its application, or uses.

Referring to FIG. 1, an anti-lock braking system (ABS) 10 is shown. A vehicle 12 includes hydraulically activated friction brakes 14, 16, 18, and 20 at vehicle wheels 22, 24, 26, and 28, respectively. A driver-actuated brake pedal 30 is mechanically and/or electrically coupled to a master cylinder (MC) 32 for producing hydraulic pressure in proportion to the force that is applied to the brake pedal 30.

The master cylinder 32, which may include a pneumatic booster (not shown), proportions the hydraulic pressure between front and rear brake supply lines 34 and 36 in a conventional manner. The front supply line 34 is coupled to the left front (LF) brake 14 by a LF anti-lock modulator (M) 38 and to the right front (RF) brake 16 by a RF anti-lock modulator (M) 40. The rear supply line 36 is coupled to the left and right rear wheel brakes 18 and 20 by a rear anti-lock modulator (M) 42.

An ABS controller 50 receives various inputs, including wheel speed signals on lines 52, 54, 56, and 58 from wheel speed sensors 60, 62, 64, and 66, respectively. The ABS controller 50 receives a brake pedal position signal PP on line 68 from pedal position sensor 70. In response to the various inputs, the ABS controller 50 outputs modulator control signals on lines 72, 74, and 76 during wheel lock-up conditions. The ABS controller 50 may also output diagnostic information signals for display on a driver information device (not shown) associated with an instrument panel. The ABS controller 50 preferably includes a processor, an input/output (I/O) interface, and memory such as read-only memory (ROM), random access memory (RAM), flash memory and/or other suitable electronic storage. The ABS controller 50 can also be implemented as an application specific integrated circuit (ASIC).

In general, the ABS controller 50 monitors the measured wheel speeds to detect a condition of insipient wheel lock. The controller 50 adjusts modulators 38, 40, and 42 to modulate the respective hydraulic brake pressures to maximize the tractive force between the vehicle tires and the road surface. When insipient wheel lock is detected, the modulators 38, 40, and 42 are activated to rapidly reduce the respective brake pressures to eliminate wheel slip. The amount of pressure reduction that is required to eliminate wheel slip varies with the coefficient of friction between the tires and the road surface. Conventional ABS assume a low coefficient of friction such as glare ice since the actual coefficient of friction of the road surface is ordinarily unknown.

The reduction in brake pressure allows the wheels 22, 24, 26, and 28 to accelerate. The control unit 50 measures the time that is required for the wheel acceleration to reach a reference acceleration value. Conventional ABS estimate the coefficient of friction based on the measured time. The modulators 38, 40, and 42 are controlled to re-apply brake pressures based on the estimated coefficient(s) of friction.

The ABS according to the present invention estimates the coefficient of friction between the tires and the road surface prior to the initial pressure reduction. For example, if the coefficient of friction is relatively high, the initial pressure reduction can be relatively small and the performance of the ABS is improved. Brake pressure can be rapidly re-applied once the wheel acceleration reaches the reference acceleration value. As a result, shorter stopping distances are produced.

In "Anti-Lock Brake Control Method Having Adaptive Initial Brake Pressure Reduction", U.S. Ser. No. 09/882,795, filed Jun. 18, 2001, which is hereby incorporated by reference, the ABS adaptively determines the coefficient of friction of the road surface. The ABS described therein determines the initial brake pressure reduction when insipient wheel lock occurs. The coefficient of friction is computed based on brake torque and vehicle weight. Brake torque and vehicle weight are adaptively determined based on a periodically updated table defining a relationship between brake pedal position and vehicle deceleration. The relationship is corrected for variations in brake heating.

FIG. 2 graphically depicts a representative relationship between vehicle deceleration and brake pedal position for braking of the vehicle 12. The relationship assumes that there is no lock-up condition and the modulators 38, 40, and 42 are inactive. Typically, a lower "knee" portion of the relationship varies considerably from stop to stop. The portion of the relationship above the knee portion tends to be linear and repeatable from stop to stop. For this reason, the lower knee portion of the relationship is preferably not used. The brake pedal position vs. vehicle deceleration relationship is preferably characterized for pedal positions and vehicle decelerations in the linear portion above the knee portion.

Braking characterization data is collected by determining pedal positions that correspond to a plurality of different vehicle deceleration values. For example, in FIG. 3, deceleration values D1, D2 and D3 correspond to pedal position values Pvsd(0), Pvsd(1), and Pvsd(2). The braking data is collected during braking operation when the pedal 30 is depressed at a "normal" rate or held in a static position for a predetermined period. Data is not collected while the brake pedal 30 is released or during panic braking. This eliminates the need to compensate for dynamic effects such as suspension, powertrain, tire and sensor dynamics.

The vehicle acceleration at the onset of braking is saved and subtracted from the deceleration during the braking operation to compensate for the effects of engine braking and the grade of the road. The road grade and other factors such as vehicle weight and brake heating may be estimated and used to compensate the collected braking data. For example, in U.S. Pat. No. 6,212,458 to Walenty et al., issued on Apr. 3, 2001, which is hereby incorporated by reference, the ABS estimates grade, vehicle weight and brake heating.

The ABS according to the present invention identifies correct slip and deceleration thresholds based on the initial brake pressure reduction that is described above and a current brake efficiency. This approach for identifying ABS slip and deceleration target thresholds involves estimating a current state of health of the brake system and generating a current pedal position versus brake output torque.

The present invention uses surface mu to calculate brake heat, vehicle weight, and grade. Surface mu is calculated using a current pedal position versus deceleration table. The following equations are described in further detail in "Anti-Lock Brake Control Method Having Adaptive Initial Brake Pressure Reduction", U.S. Ser. No. 09/882,795, filed Jun. 18, 2001:

(1) Brake_Heat = Brake_Heat $-$ ((MPH + Kcoolspdmin)$^2$ * Kcoolspd) * (Brake_Heat $-$ (Brake_Heat * Kcoolambient) + (Brake Torque * (Kheat * MPH)) * (Kmaxtemp $-$ Brake_Heat)/Kmaxtemp)

(2) Brake_Torque = ((Pedal Position $-$ (Pvsd(0)) * ((Pvsd(2) $-$ Pvsd(0))/(D3 $-$ D1))) * Kbrk_torque) + ((Update_Brake_heat $-$ Brake_heat) * Kheat_crv)

(3) Vehicle_Weight = LVW + ((((Pvsdold(2) $-$ (Pvsdold(0)) $-$ ((Pvsd(2) $-$ Pvsd(0))/(D3 $-$ D1))) * Kveh_weight) + ((Update_Brake_heat $-$ Brake_heat) * Kheat_crv)

(4) Grade = Rolling Resistance + Aerodynamic Drag + Engine Braking + Brake Torque + Accel (5) Surface_Mu = (Brake_Torque/Vehicle_Weight) * Kmu_Lambda where variables starting with a K are stored and/or calculated values.

Upon initial surface-based brake pressure reduction, wheel slip and decel target thresholds are initially set to reflect an initial coefficient of friction of the road surface. Where:

$$\text{Slip\_Target}LF \ \& \ RF = K\text{max\_slip\_Front} * \text{Surface\_Mu} \quad (6)$$

$$\text{Slip\_Target}LR \ \& \ RR = K\text{max\_slip\_Rear} * \text{Surface\_Mu} \quad (7)$$

$$\text{Decel}LF\_ \ \& \ RF = K\text{max\_decel\_Front} * \text{Surface\_Mu} \quad (8)$$

$$\text{Decel}LR\_ \ \& \ RR = K\text{max\_decel\_Rear} * \text{Surface\_Mu} \quad (9)$$

The slip and deceleration are used to fill positions in four ABS command look-up tables of the controller 50 where:

$$ABS\_TableLF(i,j)=(Kslip\_front(i,j)*Slip\_TargetLF)+(Kdecel\_front(i,j)*Decel\_TargetLF) \tag{10}$$

$$ABS\_TableLR(i,j)=(Kslip\_C(i,j)*Slip\_TargetLR)+(Kdecel\_Rear(i,j)*Decel\_TargetLR) \tag{11}$$

$$ABS\_TableRF(i,j)=(Kslip\_front(i,j)*Slip\_TargetRF)+(Kdecel\_front(i,j)*Decel\_TargetRF) \tag{12}$$

$$ABS\_TableRR(i,j)=(Kslip\_C(i,j)*Slip\_TargetRR)+(Kdecel\_Rear(i,j)*Decel\_TargetRR) \tag{13}$$

Referring now to FIG. 4, an ABS Table is shown. Before the initial pressure release, a wheel recovery timer, for example Recovery_LFc, is set to zero. The onset vehicle speed, Ovspd, is saved. Each timer is incremented for every real-time control loop until each wheel has re-accelerated to a predetermined level. The amount of time required for each wheel to recover is used to calculate the slip and decel targets. Where:

$$Expected\_Recovery\_Time=(Surface\_mu*Ovspd)*Krecovery\_Time \tag{14}$$

$$Recovery\_Delta=Expected\_Recovery\_Time/Recovery\_LFc \tag{15}$$

The following is a high to low coefficient surface change test. If true, the surface mu must be changed to reflect this occurrence. In other words, the original surface mu is no longer valid.

$$\text{If Recovery\_Delta} > Khi\_to\_lo\_co\ (0.2)\ \text{then} \tag{16}$$

$$Surface\_mu=Recovery\_Delta*KT\_mu \tag{17}$$

A surface mu adjustment is calculated using the recovery time delta and the original surface mu. This adjustment along with the original surface mu forms the new slip and decel targets:

$$Surface\_mu\_adj=Recovery\_Delta*Surface\_mu \tag{18}$$

$$Slip\_TargetLF=Slip\_TargetLF+Kmax\_slip\_Front*(Surface\_mu+Surface\_mu\_adj) \tag{19}$$

$$Decel\_TargetRR=Decel\_TargetRR+Kmax\_decel\_Rear*(Surface\_Mu+Surface\_mu\_adj) \tag{20}$$

The slip and deceleration terms are used to fill each position in the four ABS command lookup tables where:

$$ABS\_TableLF(i,j)=(Kslip\_front(i,j)*Slip\_TargetLF)+(Kdecel\_front(i,j)*Decel\_TargetLF) \tag{21}$$

$$ABS\ TableLR(i,j)=(Kslip\_C(i,j)*Slip\_TargetLR)+(Kdecel\_Rear(i,j)*Decel\_TargetLR) \tag{22}$$

The release and apply pressures are calculated from the average surface mu:

$$Front\_Release\_PSI=KmaxF\_PSI*(1-(Surface\_Mu\_adj+Surface\_Mu)/2-(Grade*Kweight\_transfer)) \tag{23}$$

$$Rear\_Release\_PSI=KmaxR\_PSI*(1-(Surface\_Mu\_adj+Surface\_Mu)/2-(Grade*Kweight\_transfer)) \tag{24}$$

$$Front\_Apply\_PSI=KmaxF\_PSI*(1-(Surface\_Mu\_adj+Surface\_Mu)/2-(Grade*Kweight\_transfer)) \tag{25}$$

$$Rear\_Apply\_PSI=KmaxR\_PSI*(1-(Surface\_Mu\_adj+Surface\_Mu)/2-(Grade*Kweight\_transfer)) \tag{26}$$

Referring now to FIG. 5, a method executed by the ABS controller 50 is shown. Control starts in step 100. In step 102, the ABS controller 50 reads brake pedal position, vehicle speeds, form slip, and form decel. The controller 50 records pedal pos vs. decel table. The ABS controller 50 calculates brake heat, brake torque, vehicle weight, grade, and surface mu. The ABS controller 50 looks up an ABS_Table(decel,Slip) command.

In step 104, the ABS controller 50 determines whether the ABS flag is true. If not, control continues with step 108 where the ABS controller 50 determines whether the ABS_Table command is equal to release. If true, control continues with step 110 and a recovery_time is incremented. Control continues with step 114 and an ABS command is executed. If step 108 is false, control continues with step 116 where control sets recovery_delta=expected_recovery_time/recovery_time.

In step 118, the controller 50 determines whether recovery_delta is greater than a constant K_hi_to_lo_co. If true, control continues with step 120 and sets surface_mu=recovery13 delta*KT_mu and surface_mu_adj=surface_mu. Otherwise, control continues from step 118 to step 122 where the controller 50 calculates the following:

$$Surface\_Mu\_adj=Recovery\_Delta*Surface\_Mu; \tag{27}$$

$$A\_Mu=(Surface\_Mu+Surface\_Mu\_adj)/2; \tag{28}$$

$$Slip\_target\_Front=Kmaxslip*A\_Mu; \tag{29}$$

$$Slip\_target\_Rear=Kmaxslip*A\_Mu; \tag{30}$$

$$Decel\_target\_Front=Kmaxslip*A\_Mu; \tag{31}$$

$$Decel\_target\_Rear=Kmaxslip*A\_Mu;\ \text{and} \tag{32}$$

$$ABS\_Table(i,j)=(Kslip\_front(i,j)*Slip\_Target(i,j)+(Kdecel\_Front(i,j)*Decel\_Target). \tag{33}$$

Control continues from step 122 to step 124 where the ABS controller 50 calculates the following:

$$Front\_Release\_PSI=KRmaxF\_PSI*(1-A\_Mu\_-(Grade*Kwt\_Transfer)) \tag{34}$$

$$Rear\_Release\_PSI=KRmaxR\_PSI*(1-A\_Mu\_-(Grade*Kwt\_Transfer)) \tag{35}$$

$$Front\_Apply\_PSI=KAmaxF\_PSI*(1-A\_Mu\_-(Grade*Kwt\_Transfer)) \tag{36}$$

$$Rear\_Apply\_PSI=KAmaxR\_PSI*(1-A\_Mu\_-(Grade*Kwt\_Transfer)) \tag{37}$$

$$Recovery\_Time=0,\ Recovery\_Delta=0,\ Ovspd=Vspd \tag{38}$$

$$Expected\_Recovery\_Time=(Surface\_Mu*Ovspd)*Krecovery\_Time \tag{39}$$

Control continues from step 124 to step 114 where the ABS controller 50 executes an ABS command.

If the ABS flag is not equal to true, control continues from step 104 to step 130 where the ABS controller 50 determines whether incipient wheel lock is present. If not, control continues with step 114. Otherwise, control continues with step 134 where the ABS controller *0 calculates the following:

$$ABS=True; \tag{40}$$

$$Ovspd=Vspd; \tag{41}$$

$$Brake\ Torque\ Release=Kmax\_release\_psi*(1-Surface\_Mu-(Grade*Kweight\_transfer)); \tag{42}$$

$$Slip\_target\_Front=Kmaxslip*Surface\_Mu; \tag{43}$$

Decel_target_Front=Kmaxslip*Surface_Mu; (44)

Slip_target_Rear=Kmaxslip*Surface_Mu; (45)

Decel_target_Rear=Kmaxslip*Surface_Mu; (46)

Fill ABS_TableF(i,j)=(Kslip_front*Slip_Target)+Kdecel_front*Decel_Target); and (47)

Fill ABS_TableR(i,j)=(Kslip_rear*Slip_Target)+Kdecel_rear*Decel_Target). (48)

Control continues from step 134 to step 136 where the ABS controller 50 releases pressure and sets expected_recovery_time=(Surface_Mu*Ovspd)*Krecovery_Time. Control continues from step 136 to step 114.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of operating a vehicle anti-lock braking system including a brake pedal and a brake modulator that reduces braking pressure by an initial pressure reduction after detecting insipient wheel lock, comprising:

measuring vehicle deceleration as a function of brake pedal position;

updating a first table with said vehicle deceleration and said brake pedal position;

estimating a coefficient of friction of a road surface based on said first table;

determining wheel slip and deceleration target thresholds based on said coefficient of friction; and using said wheel slip and deceleration target thresholds to populate a command table for said anti-lock braking system.

2. The method of claim 1 further comprising estimating brake heat.

3. The method of claim 2 wherein said brake heat is estimated based on at least vehicle speed.

4. The method of claim 2 further comprising estimating brake torque.

5. The method of claim 4 wherein said brake torque is calculated using at least pedal position.

6. The method of claim 4 further comprising estimating vehicle weight.

7. The method of claim 6 wherein said vehicle weight is estimated using at least brake heat.

8. The method of claim 6 wherein said coefficient of friction is calculated using at least brake torque and vehicle weight.

9. The method of claim 6 further comprising calculating grade.

10. The method of claim 9 wherein said grade is calculated using rolling resistance, aerodynamic drag, engine braking, brake torque and acceleration.

11. The method of claim 9 further comprising:

setting a wheel recovery timer equal to zero;

determining onset vehicle speed;

measuring an actual recovery time by timing acceleration of wheels of said vehicle to a predetermined acceleration level;

calculating an expected recovery time; and calculating a recovery delta based on said expected and actual recovery times.

12. The method of claim 11 further comprising:

updating said coefficient of friction if said recovery delta is greater than a first constant.

13. The method of claim 12 further comprising calculating an adjusted coefficient of friction based on said recovery delta and said coefficient of friction.

14. The method of claim 13 further comprising calculating wheel slip based on said adjusted coefficient of friction, said coefficient of friction, and said target wheel slip.

15. The method of claim 13 further comprising calculating wheel deceleration based on said adjusted coefficient of friction, said coefficient of friction, and said target wheel deceleration.

16. The method of claim 15 further comprising updating said command table with said wheel slip and deceleration.

17. The method of claim 16 further comprising calculating release and apply pressures from said adjusted coefficient of friction, said coefficient of friction and said grade.

18. A vehicle anti-lock braking system comprising:

a brake pedal;

a brake modulator; and a controller that communicates with said brake modulator and that measures vehicle deceleration as a function of brake pedal position, updates a first table, having a series of calibrations, with said vehicle deceleration and said brake pedal position, estimates a coefficient of friction of a road surface based on said first table, and determines wheel slip and deceleration target thresholds based on said coefficient of friction.

19. The vehicle anti-lock braking system of claim 18 wherein said controller uses said wheel slip and deceleration target thresholds to populate a command table for said anti-lock braking system.

20. The vehicle anti-lock braking system of claim 19 wherein said controller estimates brake heat.

21. The vehicle anti-lock braking system of claim 20 wherein said brake heat is estimated using at least wheel speed.

22. The vehicle anti-lock braking system of claim 20 wherein said controller estimates brake torque.

23. The vehicle anti-lock braking system of claim 22 wherein said brake torque is calculated using at least pedal position.

24. The vehicle anti-lock braking system of claim 22 wherein said controller estimates vehicle weight.

25. The vehicle anti-lock braking system of claim 24 wherein said vehicle weight is estimated using at least brake heat.

26. The vehicle anti-lock braking system of claim 24 wherein said coefficient of friction is calculated using at least brake torque and vehicle weight.

27. The vehicle anti-lock braking system of claim 24 wherein said controller estimates grade.

28. The vehicle anti-lock braking system of claim 24 wherein said grade is calculated using at least rolling resistance, aerodynamic drag, engine braking and brake torque.

29. The vehicle anti-lock braking system of claim 27 further comprising:

setting a wheel recovery timer equal to zero;

determining onset vehicle speed;

measuring an actual recovery time by timing acceleration of wheels of said vehicle to a predetermined acceleration level;

calculating an expected recovery time; and calculating a recovery delta based on said expected and actual recovery times.

30. The vehicle anti-lock braking system of claim 29 wherein said controller updates said coefficient of friction if said recovery delta is greater than a first constant.

31. The vehicle anti-lock braking system of claim 30 wherein said controller calculates an adjusted coefficient of friction based on said recovery delta and said coefficient of friction.

32. The vehicle anti-lock braking system of claim 31 wherein said controller calculates wheel slip based on said adjusted coefficient of friction, said coefficient of friction, and said target wheel slip.

33. The vehicle anti-lock braking system of claim 32 wherein said controller calculates wheel deceleration based on said adjusted coefficient of friction, said coefficient of friction, and said target wheel deceleration.

34. The vehicle anti-lock braking system of claim 33 wherein said controller updates said command table with said wheel slip and deceleration.

35. The vehicle anti-lock braking system of claim 34 wherein said controller calculates release and apply pressures from said adjusted coefficient of friction, said coefficient of friction and said grade.

* * * * *